Figure 1:
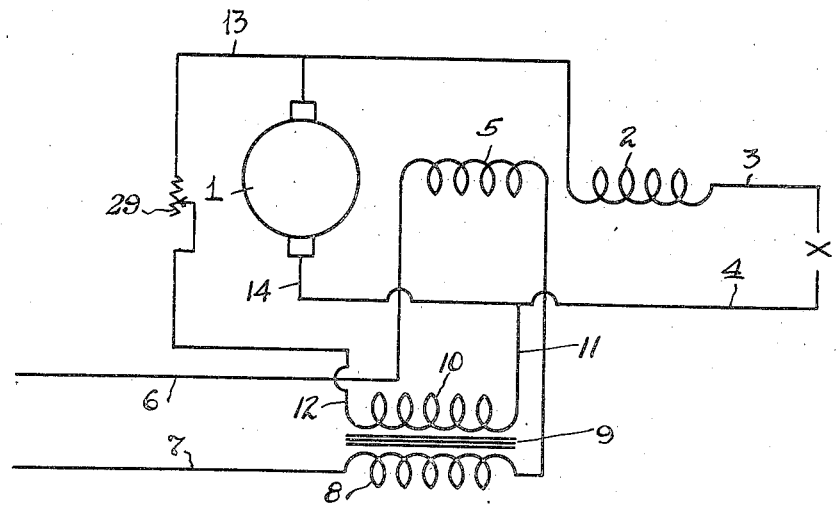

Aug. 15, 1933.   E. E. DREESE   1,922,760
MECHANISM FOR ELECTRIC WELDING AND THE LIKE
Filed April 17, 1930

INVENTOR.
Erwin E. Dreese
BY
Fay, Oberlin & Fay
ATTORNEYS.

Patented Aug. 15, 1933

1,922,760

UNITED STATES PATENT OFFICE 1,922,760

MECHANISM FOR ELECTRIC WELDING AND THE LIKE

Erwin E. Dreese, Worthington, Ohio, assignor to The Lincoln Electric Company, Cleveland, Ohio, a Corporation of Ohio Application April 17, 1930. Serial No. 444,914

5 Claims. (Cl. 219—8)

The present invention, relating as indicated, to mechanism for electric welding and the like, has more particular reference to circuits of the type employed in the arc process, and its principal object is to provide a system of electrical connections and apparatus whereby the objectionable surge or transient currents due to inductive action between the shunt or separately excited and series field windings of the welding generator can be eliminated.

In welding apparatus of the type referred to, variations in the electrical condition of the welding circuit do not result in desired changes in such circuit instantaneously because the inductive action of the series winding produces transient or surge currents in the shunt or separately excited winding which are in a direction opposing immediate field flux variations. In other words, transformer action between the field windings induces surge voltages in the separately excited or shunt winding which prevent compensating decreases in field excitation when the load current suddenly increases and similarly do not permit of sudden increases in the excitation when the load current suddenly decreases. As a consequence, the circuit does not properly and immediately respond to small and rapidly occurring variations in the welding current, and the arc does not therefore have the desired stability.

This invention, with the object of improving the sensitivity of the shunt or separately excited field winding by reducing the above mentioned surge currents, contemplates providing the exciter circuit with a heavily inductive reactance for suppressing transient currents and therefore improving the responsiveness of the main exciter winding. Due to the fact that the metal core used in this reactance may become rather strongly magnetized, the effective inductance for small changes in current may be insufficient to exert the desired choking action. To avoid any insensitivity due to magnetization of the reactance core, this invention intends providing such core with a second winding or coil through which current may be passed for demagnetization purposes; such current being supplied from any suitable source and having the effect of rendering the main coil more efficacious in suppressing or annulling small current changes. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 2:
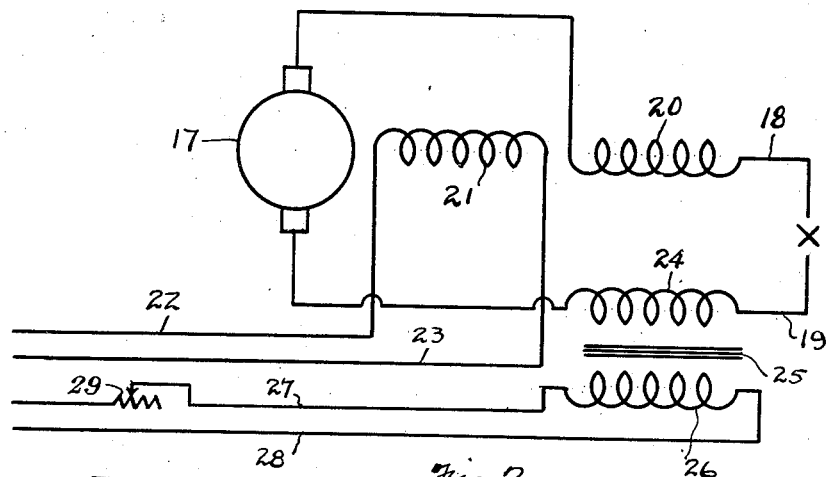
Figure 3:
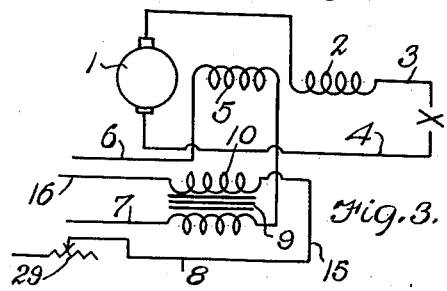

Fig. 1 is a simplified wiring diagram and illustrates the present invention as embodied in the field circuit of a dynamo-electric machine for eliminating induced surge currents; Fig. 2 is a simplified wiring diagram showing one method of employing certain of the principles of this invention to increase the effectiveness of a welding circuit reactor; Fig. 3 is a simplified wiring diagram of an alternative arrangement of the disclosure in Fig. 1.

In Fig. 1 there is more or less generally shown a welding circuit which comprises the generator armature 1, the series field winding 2, and the main leads 3 and 4, such leads being particularly intended for supplying a rapidly varying load such as an electric welding arc, for example. In addition to its series field, the generator is also provided with a shunt or separately excited field 5, its winding being supplied with current through the leads 6 and 7.

In series with the field winding 5 is a reactance comprising the coil 8 and an iron core 9. This reactance is so proportioned as to have the desired choking action upon varying currents inductively produced in the main exciter winding by the series winding 2, and is thus effective to a degree even when not provided with the demagnetizing winding about to be explained. For the purpose of demagnetizing the core 9 or changing its magnetic condition in such a manner that the coil 8 will become more effective in abating small current changes in the exciter circuit, such core may be provided with a second winding 10; this winding being for the purpose of carrying a current in a direction opposite to the current carried by the coil 8, and having leads 11 and 12. The leads 11 and 12 may be connected with most any suitable source of continuous current; as shown in solid lines, such leads are connected around the generator armature by conductors 13 and 14, but alternately such leads may be connected to the exciter brushes or to any other source through the conductors indicated in Fig. 3 at 15 and 16. A rheostat 29 or the like may be employed for determining the effectiveness of the counter winding and to some extent regulating the choking action of the inductance.

In operation, when the arc length changes or other influences produce current variations in the field winding 2, such variations will not, as ordinarily, induce similar changes in the electrical condition of the field winding 5 which would oppose immediate flux change and prevent the generator from instantaneously responding with appropriate flux variations. On the contrary such induced currents will be reduced by the reactor and, as before stated, the demagnetizing winding 10 may be employed for making such reactor more effective in suppressing small and rapidly occurring surges.

Referring more particularly to the arrangement of circuits illustrated in Fig. 1, it will be noted that the current flowing in the coil 10 will vary due to variations in the resistance of the parallel circuit containing the welding arc. Therefore, when the arc is struck, this surge of current will reflect a marked change in the current flowing in the coil 10. This change in the current flowing in the coil 10 will induce electromotive force in the coil 8 with which such coil 10 is inductively arranged. This induced electromotive force will, due to the fact that the field coil 5 is in the same circuit with the coil 8, oppose the electro-motive force tending to be induced by transformer action between the field windings 2 of the generator which are in series with the arc and such independently excited field 5. With the circuits arranged as illustrated in Fig. 1. Therefore, the effect of the coil 10 is not only to demagnetize the core of the reactor and accordingly, increase the choking effectiveness of the coil 8 but also generates a counter E. M. F. which opposes the induced E. M. F. in the field winding 5 by virtue of the transformer action between the series and shunt fields of the generator which occurs upon any marked change in the characteristics of the welding circuit such as the initiation or interruption of the welding arc.

In Fig. 2 there is shown a welding or like circuit consisting of the generator armature 17, the main leads 18 and 19, a series field winding 20, and shunt or separately excited field winding 21, the latter being supplied with current through the leads 22 and 23. In series with the leads 18 and 19 is a reactor 24 having an iron core 25, this reactor functioning to smooth out the welding current. For increasing its effectiveness, the core 25 may be provided with a second and counter winding 26 which may be supplied with currents through the leads 27 and 28, such current coming from any suitable source such as the brushes of the welding generator, the brushes of the exciter, or an independent direct current line, and serving to demagnetize the core 25, thus increasing the change of flux for small changes of current to the welding circuit by diminishing the core's condition of magnetic saturation.

The effect of transformer action between the separate windings of the reactor as explained in connection with the diagram illustrated in Fig. 1, which, in such first-named arrangement, is effective to oppose the transformer action between the fields of the generator upon a change in the arc circuit characteristics, may also be utilized when the arrangement of the circuits is such as is illustrated in Figs. 2 and 3, i. e., the leads 27 and 28 in Fig. 2 and the corresponding leads of the independent circuit in Fig. 3 might be suitably connected to the fields of the welding current generator so as to produce a like controlling effect.

Other modes of applying the principle of the invention may be employed instead of the one explained, change being made as regards the mechanism herein disclosed, provided the means stated by any of the following claims or the equivalent of such stated means be employed.

I therefore particularly point out and distinctly claim as my invention:—

1. The combination with a welding circuit; of a welding current generator having two fields respectively connected with the welding circuit and an independent circuit; and a reactor having a coil in series with said last named field, a magnetic core, and a second coil on said core connected in parallel with the arc in said welding circuit.

2. The combination with a welding circuit, of a welding current generator in said circuit, an independently excited field in said generator, a coil in said field circuit, a core of magnetic material in said coil, and a second coil on said core connected in parallel with the arc in said welding circuit.

3. The combination with a welding circuit, of a welding current generator; an independent circuit; a field coil in said generator connected in said independent circuit; and a reactor having a coil in series with said field coil and a second coil, inductively arranged with respect to said first named coil, connected in parallel with the arc in said welding circuit.

4. The combination with a welding circuit, of a welding current generator having a field winding in series with the welding circuit, an auxiliary field winding, a reactor in series with said last named winding, a core for said reactor, and a demagnetizing winding on said core.

5. The combination of a welding current generator, a welding circuit, an exciter circuit, field windings in said generator respectively connected in series in said welding and exciting circuits, a reactor in series with said winding in said exciter circuit, a core for said reactor, and a demagnetizing winding on said core.

ERWIN E. DREESE.